(No Model.) 3 Sheets—Sheet 3.

O. T. JOSLIN & H. B. SCHMIDT.
MACHINE FOR THICKENING LIQUIDS.

No. 603,087. Patented Apr. 26, 1898.

Witnesses:
E. P. Shipley.
M. S. Belden.

Omar T. Joslin
Herman B. Schmidt
Inventors
by James W. See
Attorney

UNITED STATES PATENT OFFICE.

OMAR T. JOSLIN, OF NEW YORK, N. Y., AND HERMAN B. SCHMIDT, OF CINCINNATI, OHIO, ASSIGNORS OF ONE-HALF TO THE BLACK & CLAWSON COMPANY, OF HAMILTON, OHIO.

MACHINE FOR THICKENING LIQUIDS.

SPECIFICATION forming part of Letters Patent No. 603,087, dated April 26, 1898.

Application filed May 29, 1897. Serial No. 638,691. (No model.)

*To all whom it may concern:*

Be it known that we, OMAR T. JOSLIN, of New York, New York county, New York, and HERMAN B. SCHMIDT, of Cincinnati, Hamilton county, Ohio, have invented certain new and useful Improvements in Machines for Thickening Liquids, (Case E,) of which the following is a specification.

This invention pertains to improvements in machines for thickening liquids by process of evaporation; and the invention will be readily understood from the following description, taken in connection with the accompanying drawings, in which—

Figure 1:
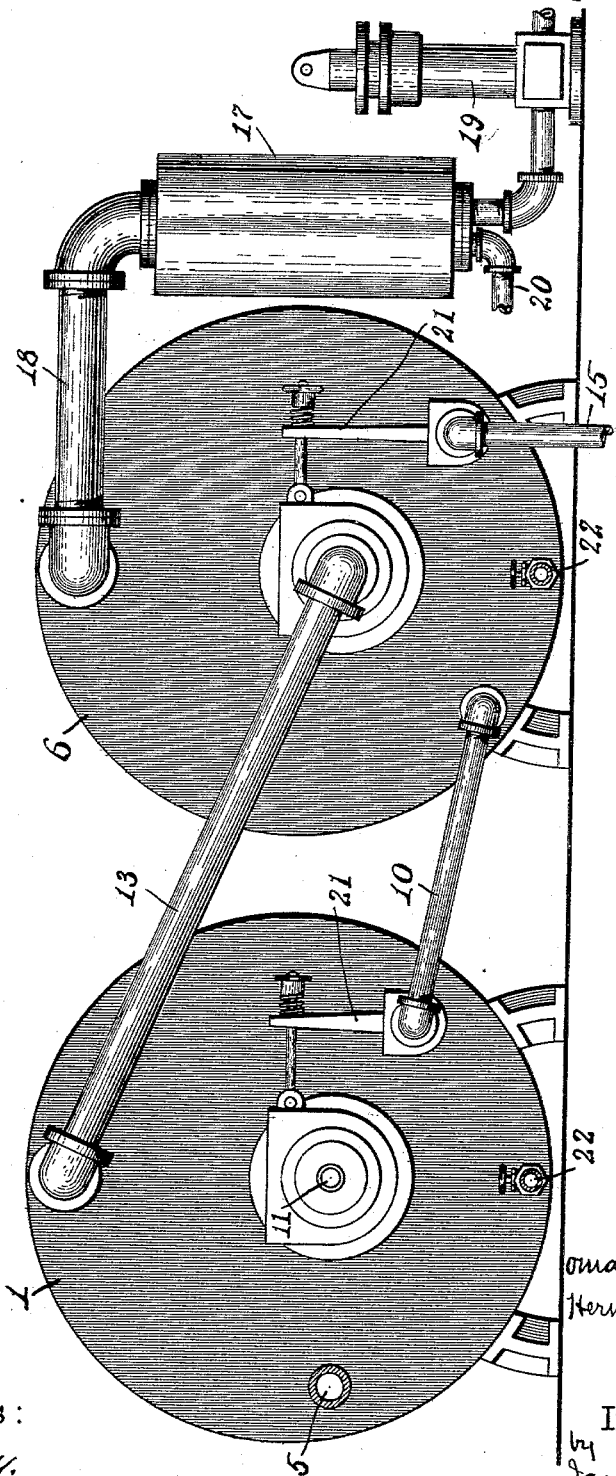
Figure 2:
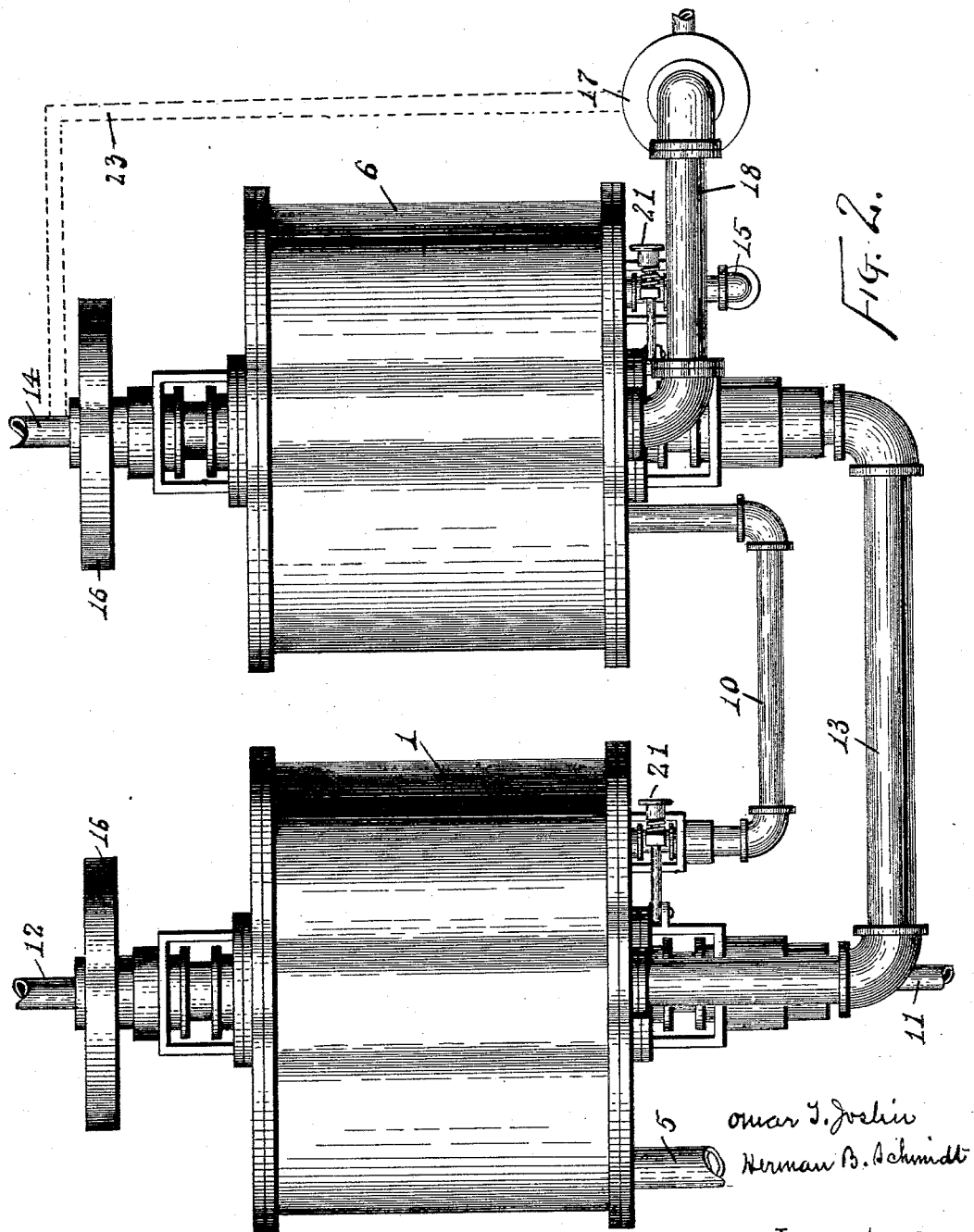
Figure 3:
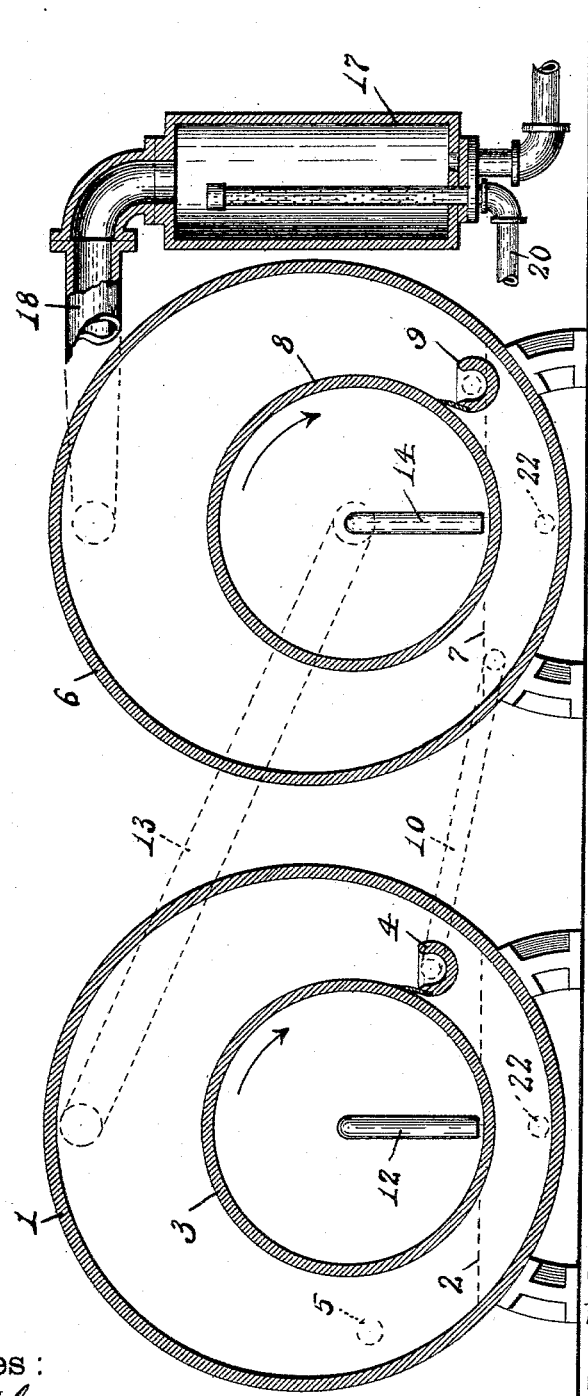

Figure 1 is a side elevation of a machine exemplifying our improvement; Fig. 2, a plan of the same, and Fig. 3 a vertical longitudinal section.

In the drawings, 1 indicates an air-tight inclosing vessel forming a vat to receive the liquid to be dealt with; 2, the upper surface of the liquid therein; 3, a hollow metallic cylinder mounted for rotation within the vat 1 and dipping the lower portion of its periphery into the liquid in the vat; 4, a doctor disposed within the vat 1 and arranged to scrape the cylinder 3 at a point near where the periphery of the cylinder enters the liquid in the vat, this doctor having a trough form, so as to catch the scrapings, the trough of the doctor having pipe connection leading outside the vat; 5, inlet-aperture exemplifying a suitable opening by means of which the liquid may be introduced into the vat 1 and maintained therein at proper depth; 6, a second vat, similar to the first one; 7, the liquid therein; 8, a rotary cylinder within vat 6 and similar to cylinder 3; 9, a doctor within vat 6 and similar to doctor 4; 10, a pipe leading from the outlet of doctor 4 to the interior of vat 6, this pipe being adapted to conduct the matter scraped from cylinder 3 by doctor 4 into the vat 6; 11, a steam-pipe communicating with the interior of cylinder 3 through one of the end journals of that cylinder and adapted to charge cylinder 3 with steam and heat the cylinder; 12, outlet-pipe for the water of condensation from cylinder 3, the arrangement being the ordinary one by means of which steam-heated cylinders are kept hot; 13, a pipe leading from the upper portion of vat 1 to the interior of cylinder 8 through one of the end journals of said cylinder, whereby vapors in vat 1 will find their way to the interior of cylinder 8; 14, outlet-pipe for the water of condensation from cylinder 8; 15, outlet from the trough of doctor 9, whereby the matter scraped from cylinder 8 by that doctor is conveyed outside of vat 6 for future disposition; 16, power-transmitting devices on the two cylinders 3 and 8, whereby those cylinders may be rotated; 17, a condenser; 18, a pipe leading from the upper portion of vat 6 to the interior of the condenser; 19, air-pump for draining the condenser; 20, injection-pipe for carrying condensing-water to the condenser; 21, adjusting devices for holding the doctors to their cylinders, the doctors having trunnions and the adjusting devices consisting of levers and adjustable springs to produce the proper scraping pressure, the general arrangement being of an ordinary character well known in connection with doctors; 22, drains from the two vats, and 23 a pipe connecting pipe 14 with the condenser and illustrating exemplifying means for withdrawing the water of condensation from cylinder 8.

The vats are air-tight, and the mountings of the cylinders and doctors therein, as regards stuffing-boxes, &c., are with usual due regard to such fact.

The system results in a multiple-effect evaporating apparatus capable of producing a comparatively dry product from certain liquids at low temperature of exposure and with superior economy of heat and rapidity of action. The general *rationale* of the multiple-effect system will be readily comprehended from the described action of the double-effect apparatus chosen for exemplification.

The liquid to be thickened is introduced into vat 1 and maintained therein at a substantially constant level, so that the lower portion of the periphery of cylinder 3 will dip therein, the cylinder continually rotating in the direction of the arrow. Live steam to heat cylinder 3 enters through pipe 11 by virtue of its own pressure, which pressure serves also, as usual, to expel the water of condensation through pipe 12. Hot cylinder 3 rotating and dipping into the liquid in vat 1 becomes wetted or coated by the liquid and the heat of the cylinder evaporates water from the coating, doctor 4 scraping the thickened coating from the cylinder. The thickened matter scraped from cylinder 3 by doctor 4 goes through pipe 10 to vat 6, where it is similarly acted upon by rotating hot cylinder 8, from which the greatly-thickened matter is scraped by doctor 9, which discharges the matter through pipe 15. The vapors formed in vat 6 by the evaporative action of hot cylinder 8 are drawn off through pipe 18 into the condenser, where they are condensed, a partial vacuum being thus produced in vat 6, thus accelerating the evaporative action under comparatively low temperature. The withdrawal of the thickened matter from vat 6 through pipe 15, which communicates with doctor 9, must be effected against the resistance offered by the partial vacuum in vat 6, which is to be accomplished by giving sufficient fall to pipe 15 or by equivalent suction agency.

The vapors resulting from the evaporation taking place in vat 1 pass through pipe 13 to the interior of cylinder 8 and form the heating agency for that cylinder, the cylinder 8 at the same time forming a condenser for those vapors and thus producing a partial vacuum in vat 1, the superior vacuum being in vat 6. The water of condensation discharged from cylinder 8 through pipe 14 must be withdrawn against the resistance offered by the vacuum in cylinder 8, which is to be accomplished by giving sufficient fall to the outer discharge portion of pipe 14 or by equivalent suction agency—as, for instance, by connecting pipe 14 with the condenser, as illustrated at 23.

We claim as our invention—

1. In a machine for thickening liquids, the combination, substantially as set forth, of a vat adapted to receive the liquid to be dealt with, a hollow metallic cylinder mounted for rotation in said vat with the lower portion of its periphery dipping into the liquid in the vat, means for charging the interior of said rotating cylinder with a heating agent, a doctor engaging said rotating cylinder as it approaches the liquid in the vat and adapted to scrape the coating from the cylinder, and means for producing a partial vacuum in said vat over said rotating cylinder.

2. In a machine for thickening liquids, the combination, substantially as set forth, of a vat adapted to contain the liquid to be dealt with, a hollow metallic cylinder mounted for rotation within said vat and dipping the lower portion of its periphery into the liquid therein, means for charging the interior of said rotating cylinder with a heat-transferring agent, and a trough-shaped doctor engaging said cylinder as it approaches the liquid in the vat and having a discharge connection to the exterior of said vat.

3. In a machine for thickening liquids, the combination, substantially as set forth, of a vat adapted to receive the liquid to be dealt with, a hollow metallic cylinder mounted for rotation in said vat with the lower portion of its periphery dipping into the liquid therein, a doctor disposed within said vat and arranged to scrape said cylinder and discharge the scrapings exterior to said vat, means for producing a partial vacuum in said vat over said cylinder, a second vat, a cylinder therein, a doctor in the second vat, a conduit from the first-mentioned doctor to the second vat, and a conduit from the first vat to the second-mentioned cylinder.

OMAR T. JOSLIN.
HERMAN B. SCHMIDT.

Witnesses:
SAM D. FITTON, Jr.,
F. C. TROWBRIDGE.